(12) United States Patent
Makino

(10) Patent No.: US 7,631,843 B2
(45) Date of Patent: Dec. 15, 2009

(54) DISPLAY

(75) Inventor: Katsuhiko Makino, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 117 days.

(21) Appl. No.: 11/873,792

(22) Filed: Oct. 17, 2007

(65) Prior Publication Data

US 2008/0093515 A1 Apr. 24, 2008

(30) Foreign Application Priority Data

Oct. 18, 2006 (JP) ............................. 2006-284178

(51) Int. Cl.
*F16M 11/00* (2006.01)
(52) U.S. Cl. .............................. 248/176.1; 361/679.21
(58) Field of Classification Search .............. 248/291.1, 248/917, 919, 922, 923; 361/679.22, 679.21, 361/679.05
See application file for complete search history.

(56) References Cited

U.S. PATENT DOCUMENTS

2004/0084588 A1 5/2004 Liu et al.
2007/0210220 A1* 9/2007 Sawai et al. .............. 248/122.1

FOREIGN PATENT DOCUMENTS

| JP | 2004-118191 A | 4/2004 |
| JP | 3107250 U | 12/2004 |
| JP | 3110945 U | 5/2005 |
| JP | 2005-221823 A | 8/2005 |
| JP | 3116087 U | 10/2005 |
| JP | 2006-91713 A | 4/2006 |

OTHER PUBLICATIONS

Japanese Office Action dated Aug. 5, 2008 w/English translation (five (5) pages).

* cited by examiner

*Primary Examiner*—Anita M King
*Assistant Examiner*—Erin Smith
(74) *Attorney, Agent, or Firm*—Crowell & Moring LLP

(57) ABSTRACT

This display includes a bracket member mounted on a display screen portion and a stand member including a pair of support portions, having an L-shaped cross section, mounted with the bracket member slid from above, while the bracket member includes a pair of first regulating portions regulating downward movement of the bracket member with respect to the stand member by coming into contact with the pair of support portions of the stand member respectively and a pair of second regulating portions regulating anteroposterior movement of the bracket member with respect to the stand member by anteroposteriorly holding the pair of support portions of the stand member respectively.

15 Claims, 8 Drawing Sheets

DISPLAY

BACKGROUND OF THE INVENTION

1. Field of the Invention

The present invention relates to a display, and more particularly, it relates to a display comprising a display screen portion.

2. Description of the Background Art

A display comprising a display screen portion is known in general, as disclosed in each of Japanese Patent Laying-Open Nos. 2006-91713 and 2005-221823, Japanese Utility Model Registration Nos. 3116087 and 3107250 and Japanese Patent Laying-Open No. 2004-118191, for example.

The aforementioned Japanese Patent Laying-Open No. 2006-91713 discloses a display comprising a display screen portion (display body) having a chassis therein, a stand provided with a mounting bracket rotatably supporting the display screen portion (display body) from the rear surface thereof and a coupling piece held between the display screen portion (display body) and the mounting bracket. This display is so formed as to vertically position the mounting bracket by fitting horizontally protruding platelike lugs (protrusions) integrally provided on both ends of the mounting bracket into hooks of the coupling piece from below so that the mounting bracket and the coupling piece can be simultaneously screwed to the chassis of the display screen (display body) when the display screen portion (display body) is mounted on the stand in an assembling step.

The aforementioned Japanese Patent Laying-Open No. 2005-221823 discloses a display comprising a display screen portion (display body) having a back cover integrally provided therein with a convex storage portion and a stand provided with a mounting bracket rotatably supporting the display screen portion (display body) from the rear surface thereof. This display is so formed as to position the mounting bracket by fitting the mounting bracket having a platelike engaging portion into an engaging portion integrally provided on the storage portion of the back cover so that the mounting bracket can be screwed to the back cover of the display body when the display screen portion (display body) is mounted on the stand in an assembling step.

The aforementioned Japanese Utility Model Registration No. 3116087 discloses a display (liquid crystal television) comprising a display screen portion (display body) mounted therein with a metal bracket (body bracket) and a stand provided with a platelike mounting bracket (support bracket) supporting the display screen portion (display body). This display (liquid crystal television) is so formed as to insert the platelike mounting bracket (support bracket) upward from below the display screen portion (display body) along the bracket (body bracket) so that the mounting bracket can be fixed to the stand when the display screen portion (display body) is mounted on the stand. A stopper contact portion is provided in the vicinity of the central portion of the upper end of the mounting bracket (support bracket), so that the mounting bracket comes into contact with a stopper portion provided on the bracket (body bracket) to be positioned in the upward direction.

The aforementioned Japanese Utility Model Registration No. 3107250 discloses a display comprising a display screen portion (display body) provided with a coupling portion on a lower portion of a cabinet and a stand unit provided with a mounting bracket (leg section) supporting the display screen (display body) from below the bottom surface thereof. This display is so formed as to bring the mounting bracket (leg section), formed in a stepwise manner, upwardly into contact with the coupling portion provided on the lower portion of the cabinet so that the mounting bracket can be screwed to the coupling portion when the display screen portion (display body) is mounted on the stand unit.

The aforementioned Japanese Patent Laying-Open No. 2004-118191 discloses a display (flat display) comprising a self-supportable display screen portion (display body) provided with a longitudinal platelike sliding portion (light stand) on the rear surface thereof and a stand (base stand) supporting the display screen (display body) when connected with the sliding portion. This display (flat display) is so formed that a longitudinal rectangular notch provided on the sliding portion engages with an engaging portion provided in the stand when the sliding portion (light stand) is inserted into the stand from above, thereby connecting the sliding portion and the stand with each other.

In the conventional display proposed in the aforementioned Japanese Patent Laying-Open No. 2006-91713, however, the platelike lugs (protrusions) of the mounting bracket engaging with the hooks of the coupling piece may conceivably be easily deformed by the own weight of the display screen portion (display body) when the display screen portion (display body) including metal components etc. is placed thereon. Therefore, the mounting bracket is disadvantageously insufficient in strength.

In the conventional display proposed in the aforementioned Japanese Patent Laying-Open No. 2005-221823, the portion of the mounting bracket engaging with the back cover storage portion is so platelike that the mounting bracket may conceivably be easily deformed by the own weight of the display screen portion (display body) when the display screen portion (display body) including metal components etc. is placed thereon. Therefore, the mounting bracket is disadvantageously insufficient in strength.

In the conventional display (liquid crystal television) proposed in the aforementioned Japanese Utility Model Registration No. 3116087, the platelike mounting bracket (support bracket) may conceivably be easily deformed by the own weight of the display screen portion (display body) when the display screen portion (display body) including metal components etc. is placed thereon. Therefore, the mounting bracket is disadvantageously insufficient in strength. Further, the stopper contact portion so provided on the mounting bracket that the mounting bracket comes into contact with the stopper portion of the bracket (body bracket) from below to be inhibited from upward movement is provided only in the vicinity of the central portion of the mounting bracket. When the heavy display screen portion (display body) including metal components etc. and having a horizontally long shape is mounted on the stand, therefore, the former cannot be stably placed (temporarily placed) on the latter.

In the conventional display proposed in the aforementioned Japanese Utility Model Registration No. 3107250, the mounting bracket is provided with no portion (movement regulating portion etc.) for regulating frontward movement of the display screen (display body) when the same is placed on the stand unit in the assembling step, whereby the display screen portion (display body) may conceivably be easily displaced frontward due to abrupt external force or the like, to slip off the stand unit. Therefore, the display screen portion (display body) cannot be reliably horizontally positioned when mounted on the stand unit.

When the display screen portion (display body) is connected to the stand in the conventional display (flat display) proposed in the aforementioned Japanese Patent Laying-Open No. 2004-118191, the mounting bracket may conceivably be distorted along the connected portion serving as the rotation center to be deformed due to the platelike sliding portion provided with the longitudinal rectangular notch if abrupt external force is horizontally applied to the display screen portion (display body). Therefore, the mounting bracket is disadvantageously insufficient in strength.

SUMMARY OF THE INVENTION

The present invention has been proposed in order to solve the aforementioned problems, and an object of the present invention is to provide a display, in which a display screen portion is reliably anteroposteriorly positioned in a working step for mounting the display screen portion on a stand, the display screen portion can be stably placed on the stand, and component strength of a mounting bracket can be improved.

A display according to a first aspect of the present invention comprises a bracket member mounted on a display screen portion and a stand member including a pair of support portions, having an L-shaped cross section, mounted with the bracket member slid from above, while the bracket member includes a pair of first regulating portions regulating downward movement of the bracket member with respect to the stand member by coming into contact with the pair of support portions of the stand member respectively and a pair of second regulating portions regulating anteroposterior movement of the bracket member with respect to the stand member by anteroposteriorly holding the pair of support portions of the stand member respectively.

In the display according to the first aspect of the present invention, as hereinabove described, the stand member is so formed as to include the support portions having the L-shaped cross section, whereby the support portions are improved in rigidity dissimilarly to a case where the support portions receiving a vertical load from the display screen portion are in the form of linear plates. Also when the heavy display screen including metal components etc. is placed on the stand member from above, therefore, the support portions are so inhibited from buckling that component strength thereof can be improved. Further, the stand member includes the pair of support portions while the bracket member includes the pair of first regulating portions regulating downward movement of the bracket member with respect to the stand member by coming into contact with the pair of support portions of the stand member respectively so that the horizontal pair of first regulating portions vertically position-control the bracket member with respect to the stand member when the former is placed on the latter, whereby the display screen portion can be stably placed on the support portions through the first regulating portions provided on two horizontal portions, dissimilarly to a case where only one first regulating portion is provided on the center of the bracket member. Further, the bracket member includes the pair of second regulating portions regulating anteroposterior movement of the bracket member with respect to the stand member by anteroposteriorly holding the pair of support portions of the stand member respectively so that the pair of second regulating portions anteroposteriorly hold the pair of support portions respectively when the display screen portion mounted with the bracket member is placed on the support portions of the stand member from above, whereby movement of the display screen portion is regulated not only in the vertical direction with the first regulating portions but also in the anteroposterior direction with the second regulating portions provided on the two horizontal portions. Thus, the display screen portion can be reliably anteroposteriorly position-controlled and fixed, while the number of fastening members such as screws having been generally required for fixing the bracket member to the stand member can be reduced by two in response to the two horizontal portions. While the bracket member is generally fixed to the stand member on four portions, therefore, the number of portions for fastening members such as screws for fixing the bracket member to the stand member can be reduced to two, thereby improving assembling workability.

In the aforementioned display according to the first aspect, the bracket member preferably further includes a planar portion for coming into surface contact with the pair of support portions of the stand member, and the pair of support portions of the stand member are preferably held in a region located between the planar portion and the pair of second regulating portions of the bracket member thereby regulating anteroposterior movement of the bracket member. According to this structure, the stand member can be reliably anteroposteriorly position-controlled while anteroposteriorly holding the pair of support portions of the stand member with the planar portion and the second regulating portions, provided on the two horizontal portions, of the bracket member.

In this case, the pair of second regulating portions preferably have contact surfaces regulating anteroposterior movement of the bracket member while coming into surface contact with the pair of support portions of the stand member respectively. According to this structure, movement of the display screen portion is regulated through surface contact between the contact surfaces of the second regulating portions provided on the two horizontal portions and the pair of support portions of the stand member, whereby the display screen portion can be more reliably anteroposteriorly position-controlled.

In the aforementioned display according to the first aspect, the pair of first regulating portions of the bracket member preferably have holes respectively, and the pair of support portions of the stand member preferably have protrusions upwardly protruding from an upper portion of the stand member and contact portions provided on both sides of the protrusions for vertically coming into contact with the pair of first regulating portions of the bracket member respectively, so that the protrusions of the stand member are inserted into the holes of the bracket member while the pair of first regulating portions of the bracket member come into contact with the contact portions of the stand member respectively when the bracket member is slid and mounted on the stand member. According to this structure, the pair of first regulating portions of the bracket member can have both of the function of receiving the pair of protrusions of the stand member in the holes thereof and the function of coming into contact with the contact portions of the stand member.

In this case, the contact portions provided on the pair of support portions of the stand member preferably include first contact portions provided on first sides of the protrusions so that L-shaped contact surfaces come into contact with the first regulating portions of the bracket member and second contact portions provided on second sides of the protrusions. According to this structure, the stand member comes into contact with the first regulating portions of the bracket member not only through the second contact portions of the protrusions but also through the first contact portions having the L-shaped contact surfaces, whereby the bracket member can more reliably come into contact with the stand member.

In the aforementioned display according to the first aspect, the bracket member preferably includes a guide portion so formed as to extend in a direction to be slid toward the stand member, and the guide portion preferably has a function of guiding the bracket member by moving along the side surface of the stand member when the bracket member is slid and mounted on the stand member. According to this structure, the guide portion of the bracket member can be slid along the side surface of the stand member, whereby the bracket member can be reliably and easily placed on the support portions of the stand member dissimilarly to a case where the bracket member is provided with no guide portion or the guide portion does not extend in the direction to be slid toward the stand member. Therefore, assembling workability can be further improved.

In the aforementioned display according to the first aspect, both of the bracket member and the stand member are preferably made of sheet metal, and the pair of second regulating portions of the bracket member are preferably formed integrally with the pair of first regulating portions by partially uprighting the pair of first regulating portions of the bracket member respectively. According to this structure, the bracket member and the stand member of sheet metal for connecting the heavy display screen including metal components etc. can be further improved in strength, while the pair of second regulating portions can be easily formed similarly to the pair of first regulating portions of the bracket member due to the uprighting.

In the aforementioned display according to the first aspect, the bracket member preferably has two threaded holes for mounting the bracket member on the pair of support portions of the stand member, and the two threaded holes are preferably so formed by burring as to protrude from the surface of the bracket member. According to this structure, larger depths can be ensured for the threaded holes due to the burring, whereby the bracket member can be more reliably fixed to the stand member.

In the aforementioned display according to the first aspect, the bracket member preferably further includes a planar portion for coming into surface contact with the pair of support portions of the stand member, a mounting surface for mounting the bracket member on the display screen portion and a side surface portion connecting the planar portion and the mounting surface with each other, and the planar portion and the side surface portion preferably have a first reinforcing portion so formed as to extend from the planar portion to the side surface portion. According to this structure, the bracket member can be inhibited from deformation by the first reinforcing portion so formed as to extend from the planar portion to the side surface portion also when the heavy display screen portion including metal components etc. is placed on the stand member, whereby the bracket member can be improved in component strength.

In the aforementioned display according to the first aspect, the stand member preferably further includes a coupling portion so provided as to couple the pair of support portions with each other, and the coupling portion preferably has a second reinforcing portion. According to this structure, the stand member can be inhibited from deformation by the second reinforcing portion provided on the coupling portion also when the heavy display screen portion including metal components etc. is placed on the stand member, whereby the stand member can be improved in component strength.

A display according to a second aspect of the present invention comprises a bracket member of sheet metal mounted on a display screen portion and a stand member of sheet metal including a pair of support portions, having an L-shaped cross section, mounted with the bracket member slid from above, while the bracket member includes a pair of first regulating portions regulating downward movement of the bracket member with respect to the stand member by coming into contact with the pair of support portions of the stand member respectively, a pair of second regulating portions formed integrally with the pair of first regulating portions by partially uprighting the pair of first regulating portions respectively for regulating anteroposterior movement of the bracket member with respect to the stand member by anteroposteriorly holding the pair of support portions of the stand member respectively, a guide portion, so formed as to extend in a direction to be slid toward the stand member, having a function of guiding the bracket member by moving along the side surface of the stand member, and two threaded holes so formed by burring as to protrude from the surface of the bracket member for mounting the bracket member on the pair of support portions of the stand member, the pair of first regulating portions of the bracket member have holes respectively, and the pair of support portions of the stand member have protrusions upwardly protruding from an upper portion of the stand member and contact portions provided on both sides of the protrusions for vertically coming into contact with the pair of first regulating portions of the bracket member respectively, so that the protrusions of the stand member are inserted into the holes of the bracket member while the pair of first regulating portions of the stand member come into contact with the contact portions of the stand member respectively when the bracket member is slid and mounted on the stand member.

In the display according to the second aspect of the present invention, as hereinabove described, the stand member is so formed as to include the support portions having the L-shaped cross section, whereby the support portions are improved in rigidity dissimilarly to a case where the support portions receiving a vertical load from the display screen portion are in the form of linear plates. Also when the heavy display screen including metal components etc. is placed on the stand member from above, therefore, the support portions are so inhibited from buckling that component strength thereof can be improved. Further, the stand member includes the pair of support portions while the bracket member includes the pair of first regulating portions regulating downward movement of the bracket member with respect to the stand member by coming into contact with the pair of support portions of the stand member respectively so that the horizontal pair of first regulating portions vertically position-control the bracket member with respect to the stand member when the former is placed on the latter, whereby the display screen portion can be stably placed on the support portions through the first regulating portions provided on two horizontal portions, dissimilarly to a case where only one first regulating portion is provided on the center of the bracket member. Further, the bracket member includes the pair of second regulating portions regulating anteroposterior movement of the bracket member with respect to the stand member by anteroposteriorly holding the pair of support portions of the stand member respectively so that the pair of second regulating portions anteroposteriorly hold the pair of support portions respectively when the display screen portion mounted with the bracket member is placed on the support portions of the stand member from above, whereby movement of the display screen portion is regulated not only in the vertical direction with the first regulating portions but also in the anteroposterior direction with the second regulating portions provided on the two horizontal portions. Thus, the display screen portion can be reliably anteroposteriorly position-controlled and fixed, while the number of fastening members such as screws having been generally required for fixing the bracket member to the stand member can be reduced by two in response to the two horizontal portions. While the bracket member is generally fixed to the stand member on four portions, therefore, the number of portions for fastening members such as screws for fixing the bracket member to the stand member can be reduced to two, thereby improving assembling workability.

In the display according to the second aspect, the pair of first regulating portions of the bracket member have the holes respectively and the pair of support portions of the stand member have the protrusions upwardly protruding from the upper portion of the stand member and the contact portions provided on both sides of the protrusions for vertically coming into contact with the pair of first regulating portions of the bracket member respectively so that the protrusions of the stand member are inserted into the holes of the bracket member while the pair of first regulating portions of the bracket member come into contact with the contact portions of the stand member respectively when the bracket member is slid and mounted on the stand member, whereby the pair of first regulating portions of the bracket member can have both of the function of receiving the pair of protrusions of the stand member in the holes thereof and the function of coming into contact with the contact portions of the stand member. Further, the bracket member includes the guide portion so formed as to extend in the direction to be slid toward the stand member and the guide portion has the function of guiding the bracket member by moving along the side surface of the stand member when the bracket member is slid and mounted on the stand member so that the guide portion of the bracket member can be slid along the side surface of the stand member, whereby the bracket member can be reliably and easily placed on the support portions of the stand member dissimilarly to a case where the bracket member is provided with no guide portion or the guide portion does not extend in the direction to be slid toward the stand member. Therefore, assembling workability can be further improved. In addition, both of the bracket member and the stand member are made of sheet metal and the pair of second regulating portions of the bracket member are formed integrally with the pair of first regulating portions by partially uprighting the pair of first regulating portions of the bracket member respectively, whereby the bracket member and the stand member of sheet metal for connecting the heavy display screen including metal components etc. can be further improved in strength, while the pair of second regulating portions can be easily formed similarly to the pair of first regulating portions of the bracket member due to the uprighting. Further, the bracket member has the two threaded holes for mounting the bracket member on the pair of support portions of the stand member and the two threaded holes are so formed by burring as to protrude from the surface of the bracket member so that larger depths can be ensured for the threaded holes due to the burring, whereby the bracket member can be more reliably fixed to the stand member.

In the aforementioned display according to the second aspect, the bracket member preferably further includes a planar portion for coming into surface contact with the pair of support portions of the stand member, and the pair of support portions of the stand member are preferably held in a region located between the planar portion and the pair of second regulating portions of the bracket member thereby regulating anteroposterior movement of the bracket member. According to this structure, the stand member can be reliably anteroposteriorly position-controlled while anteroposteriorly holding the pair of support portions of the stand member with the planar portion and the second regulating portions, provided on the two horizontal portions, of the bracket member.

In this case, the pair of second regulating portions preferably have contact surfaces regulating anteroposterior movement of the bracket member while coming into surface contact with the pair of support portions of the stand member respectively. According to this structure, movement of the display screen portion is regulated through surface contact between the contact surfaces of the second regulating portions provided on the two horizontal portions and the pair of support portions of the stand member, whereby the display screen portion can be more reliably anteroposteriorly position-controlled.

In the aforementioned display according to the second aspect, the contact portions provided on the pair of support portions of the stand member preferably include first contact portions provided on first sides of the protrusions so that L-shaped contact surfaces come into contact with the first regulating portions of the bracket member and second contact portions provided on second sides of the protrusions. According to this structure, the stand member comes into contact with the first regulating portions of the bracket member not only through the second contact portions of the protrusions but also through the first contact portions having the L-shaped contact surfaces, whereby the bracket member can more reliably come into contact with the stand member.

In the aforementioned display according to the second aspect, the bracket member preferably further includes a planar portion for coming into surface contact with the pair of support portions of the stand member, a mounting surface for mounting the bracket member on the display screen portion and a side surface portion connecting the planar portion and the mounting surface with each other, and the planar portion and the side surface portion have a first reinforcing portion so formed as to extend from the planar portion to the side surface portion. According to this structure, the bracket member can be inhibited from deformation by the first reinforcing portion so formed as to extend from the planar portion to the side surface portion also when the heavy display screen portion including metal components etc. is placed on the stand member, whereby the bracket member can be improved in component strength.

In the aforementioned display according to the second aspect, the stand member preferably further includes a coupling portion so provided as to couple the pair of support portions with each other, and the coupling portion preferably has a second reinforcing portion. According to this structure, the stand member can be inhibited from deformation by the second reinforcing portion provided on the coupling portion also when the heavy display screen portion including metal components etc. is placed on the stand member, whereby the stand member can be improved in component strength.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a liquid crystal display 100 according to the embodiment of the present invention is described with reference to FIGS. 1 to 8. This embodiment of the present invention is applied to the liquid crystal display 100 employed as an exemplary display.

Figure 1:
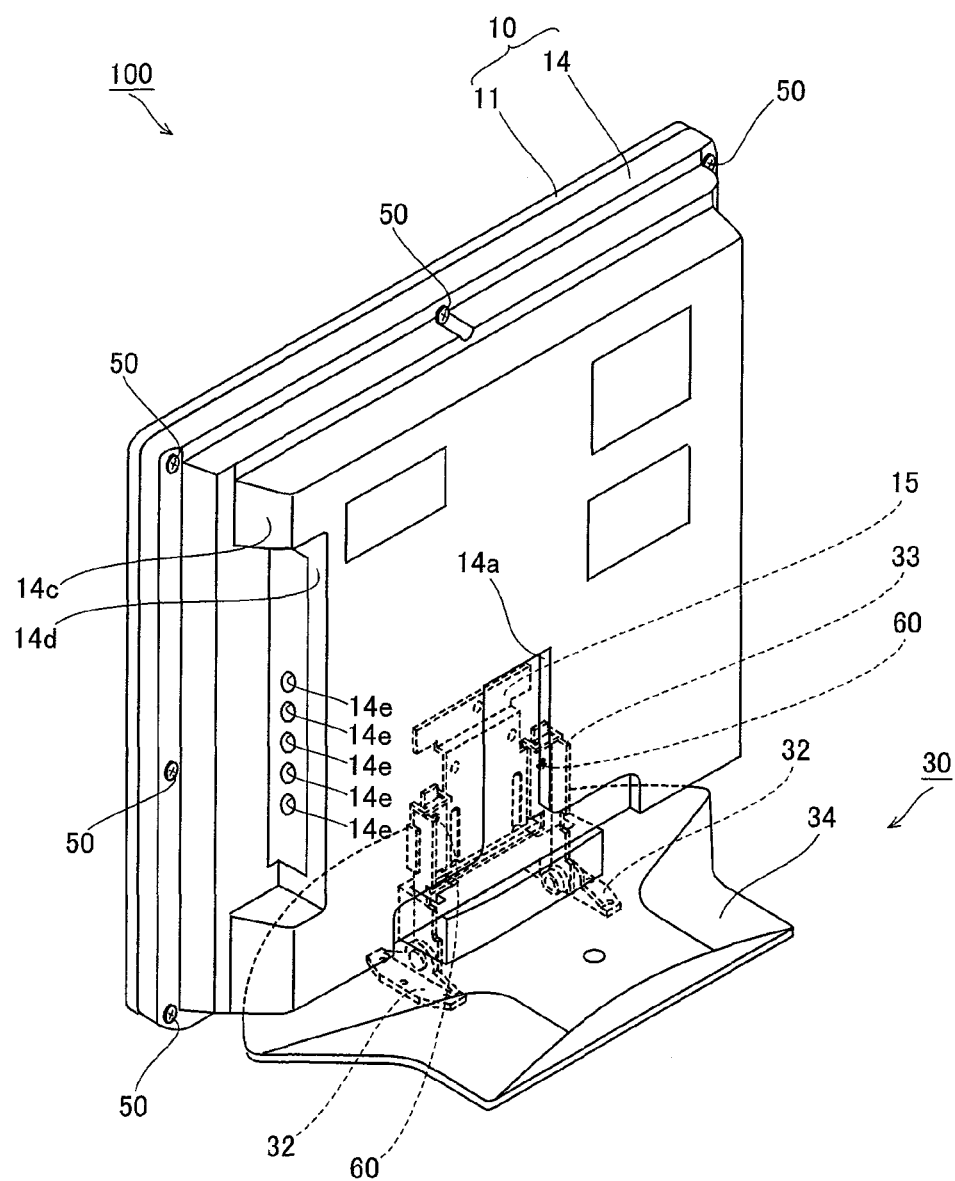
FIG. 1 is a perspective view showing the overall structure of a liquid crystal display according to an embodiment of the present invention.
Figure 2:
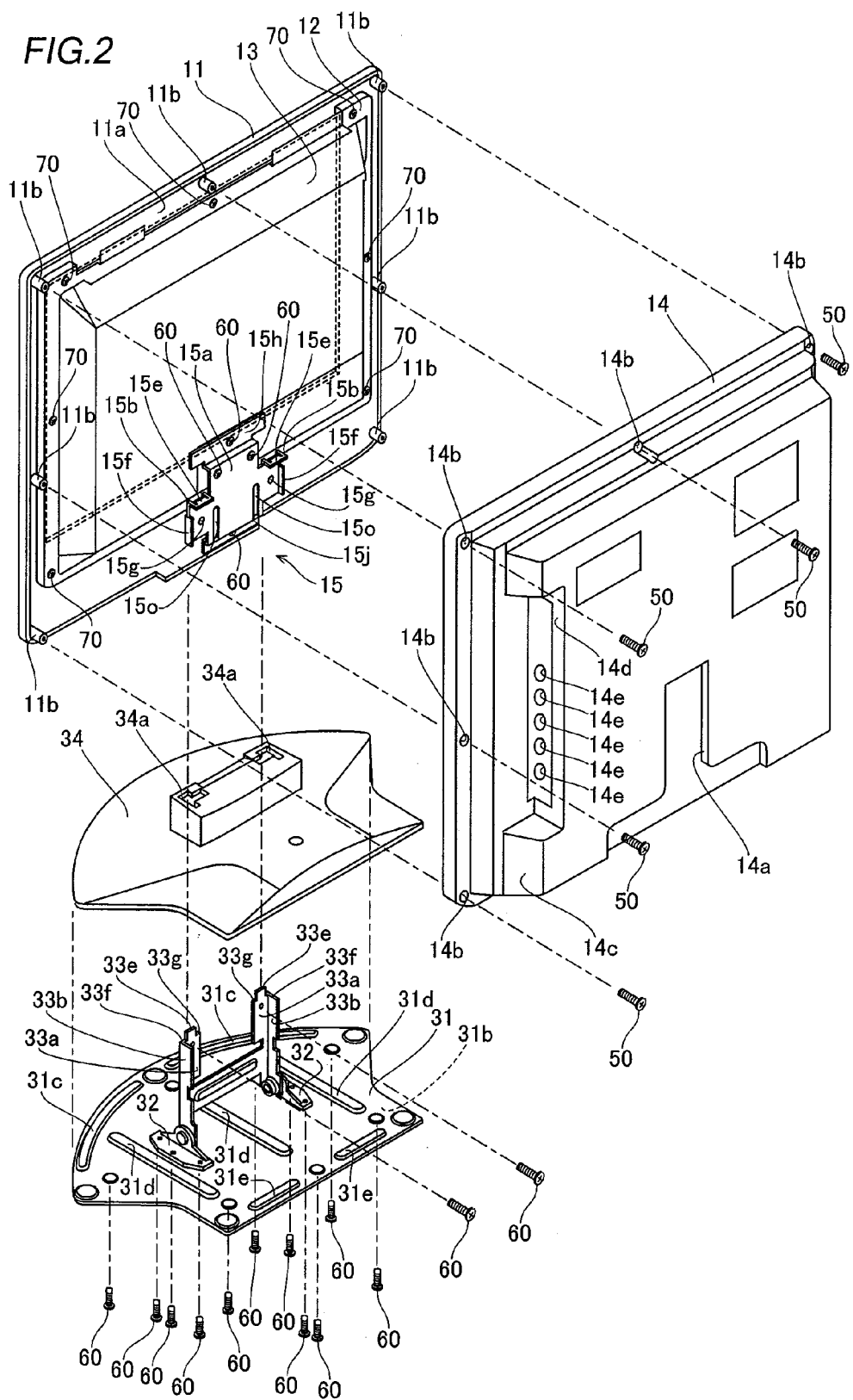
FIG. 2 is an exploded perspective view of the liquid crystal display according to the embodiment shown in FIG. 1.

The liquid crystal display 100 according to the embodiment of the present invention comprises a display body 10 and a stand 30 capable of anteroposteriorly inclining the display body 10 by a prescribed angle, as shown in FIG. 1. The display body 10 is constituted of a front cabinet 11 of resin, a liquid crystal module 13 formed by mounting a liquid crystal panel (not shown) on a chassis 12 of metal and a rear cabinet 14 of resin, as shown in FIGS. 1 and 2. A bracket member 15 of sheet metal is mounted on a lower portion of the display body 10 with screws 60 to extend over the liquid crystal module 13 and the front cabinet 11, as shown in FIG. 2. The display body 10 is an example of the "display screen portion" in the present invention.

Figure 3:
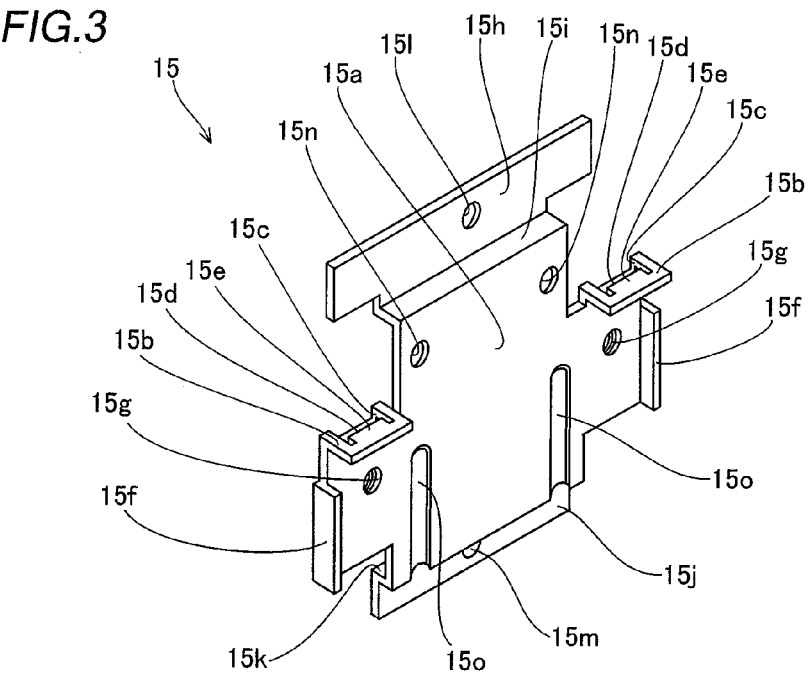
FIG. 3 is a perspective view showing a bracket member of the liquid crystal display according to the embodiment shown in FIG. 1.
Figure 5:
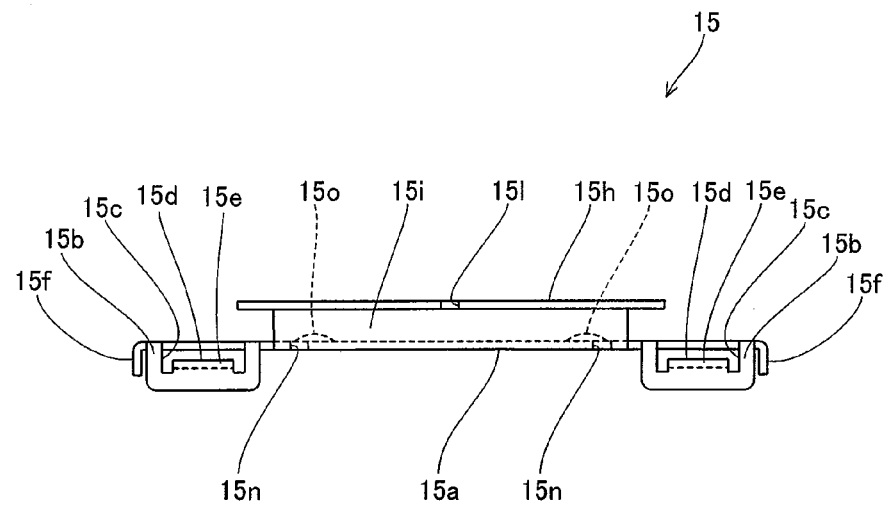
FIG. 5 is a plan view of the bracket member of the liquid crystal display according to the embodiment shown in FIG. 1.
Figure 6:
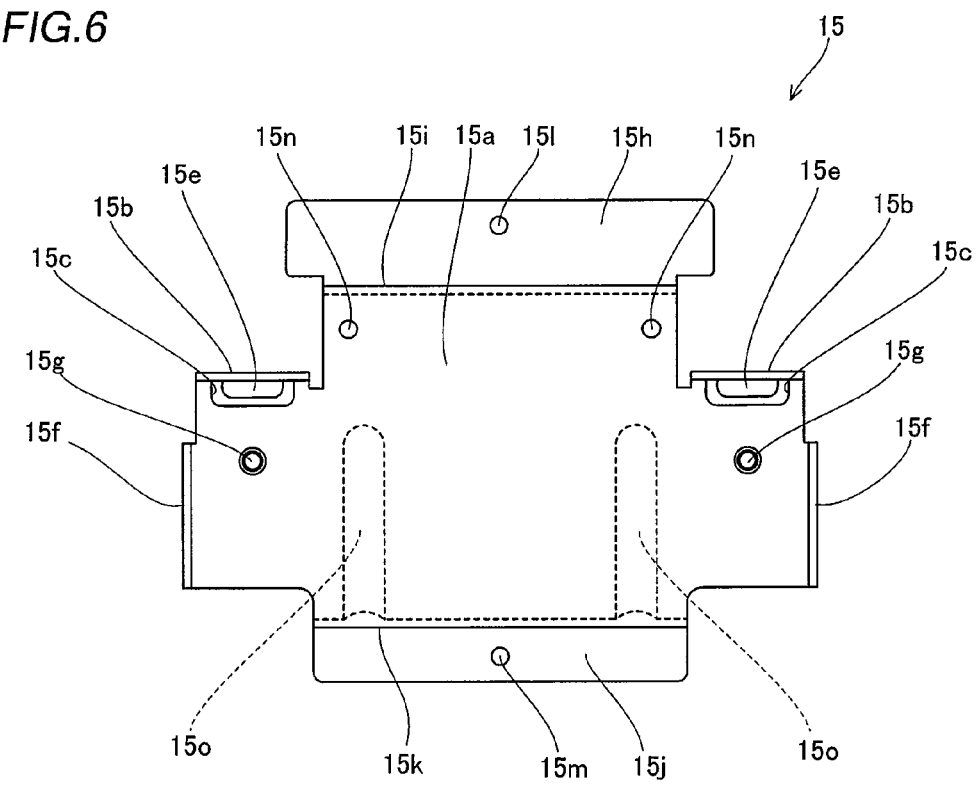
FIG. 6 is a front elevational view of the bracket member of the liquid crystal display according to the embodiment shown in FIG. 1.

According to this embodiment, a pair of horizontally extending regulating portions 15b are formed on both ends of a platelike planar portion 15a of the bracket member 15 of sheet metal integrally with the bracket member 15 by partially folding the planar portion 15 substantially by 90°, as shown in FIGS. 3 and 5. As shown in FIGS. 5 and 6, holes 15c are provided on portions of the bracket member 15 folded from the planar portion 15a toward the pair of regulating portions 15b, while another pair of regulating portions 15e having contact surfaces 15d substantially parallel to the planar portion 15a are integrally provided inside the pair of regulating portions 15b by partially uprighting the pair of regulating portions 15b respectively. The regulating portions 15b and 15e are examples of the "first regulating portions" and the "second regulating portions" in the present invention respectively. The pair of regulating portions 15b have a function of regulating downward movement of the bracket member 15 with respect to a stand member 33 described later by coming into contact with the upper ends of a pair of support portions 33c of the stand member 33 respectively. The other pair of regulating portions 15e have a function of regulating anteroposterior movement of the bracket member 15 with respect to the stand member 33 while anteroposteriorly fixing the bracket member 15 to the stand member 33 by anteroposteriorly holding the pair of support portions 33c of the stand member 33 respectively along with the planar portion 15a. As shown in FIG. 5, the distance between the planar portion 15a of the bracket member 15 and the contact surfaces 15d of the pair of regulating portions 15e is rendered slightly larger (wider) than the thickness of the stand member 33 of sheet metal. A pair of vertically extending guide portions 15f are provided on both ends of the planar portion 15a of the bracket member 15 integrally with the bracket member 15 by partially folding the planar portion 15a substantially by 90°, as shown in FIGS. 3 and 5. The guide portions 15f have a function of guiding the bracket member 15 by vertically moving along side surface portions 33b of the stand member 33 described later. A pair of threaded holes 15g having threaded inner side surfaces are formed in the vicinity of the guide portions 15f of the planar portion 15a of the bracket member 15 to protrude from the front surface (this side of FIG. 6) toward the rear side (the other side in FIG. 6) of the bracket member 15 by press working such as burring, as shown in FIG. 6. Each threaded hole 15g is so formed that the length (depth) thereof is larger than the thickness of the bracket member 15, as shown in FIG. 7.

Figure 7:
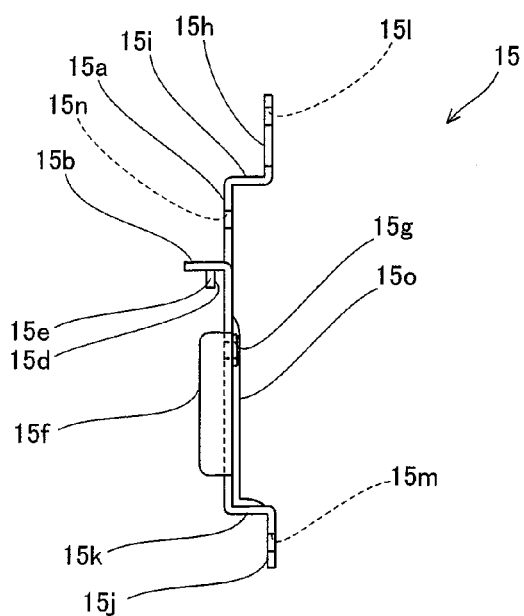
FIG. 7 is a side elevational view of the stand member of the liquid crystal display according to the embodiment shown in FIG. 1.

A mounting surface 15h parallel to the planar portion 15a is connected to the upper end of the planar portion 15a of the bracket member 15 through a horizontally bent first side surface 15i while another mounting surface 15j parallel to the planar portion 15a is connected to the lower end of the planar portion 15a of the bracket member 15 through a horizontally bent second side surface 15k, as shown in FIGS. 6 and 7. These mounting surfaces 15h and 15j are provided with screw receiving holes 15l and 15m in substantially central portions thereof respectively, as shown in FIG. 6. The bracket member 15 is so mounted as to extend over the liquid crystal module 13 (see FIG. 2) and the front cabinet 11 (see FIG. 2) through the screws 60 inserted into the screw receiving holes 15l and 15m. Two screw receiving holes 15n are provided on the planar portion 15a of the bracket member 15 as shown in FIG. 6, so that the bracket member 15 is mounted on the liquid crystal module 13 (see FIG. 2) with the screws 60 (see FIG. 2).

According to this embodiment, two rounded convex reinforcing portions 15o are formed by beading to extend from the planar portion 15a toward the second side surface 15k of the bracket member 15 respectively, as shown in FIGS. 6 and 7. The second surface 15k is an example of the "side surface portion" in the present invention, and the reinforcing portions 15o are examples of the "first reinforcing portion" in the present invention.

The stand 30 is constituted of a base 31 of sheet metal, a pair of vertical support members 32, the stand member 33 of sheet metal and a cover member 34 of resin, as shown in FIG. 2.

Figure 4:
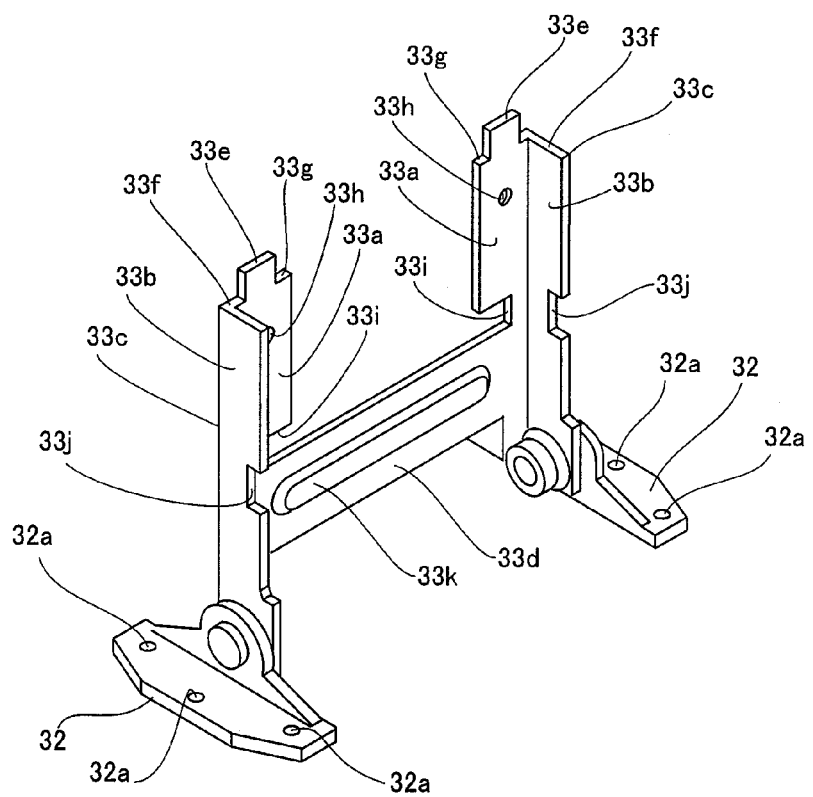
FIG. 4 is a perspective view showing a stand member of the liquid crystal display according to the embodiment shown in FIG. 1.
Figure 8:
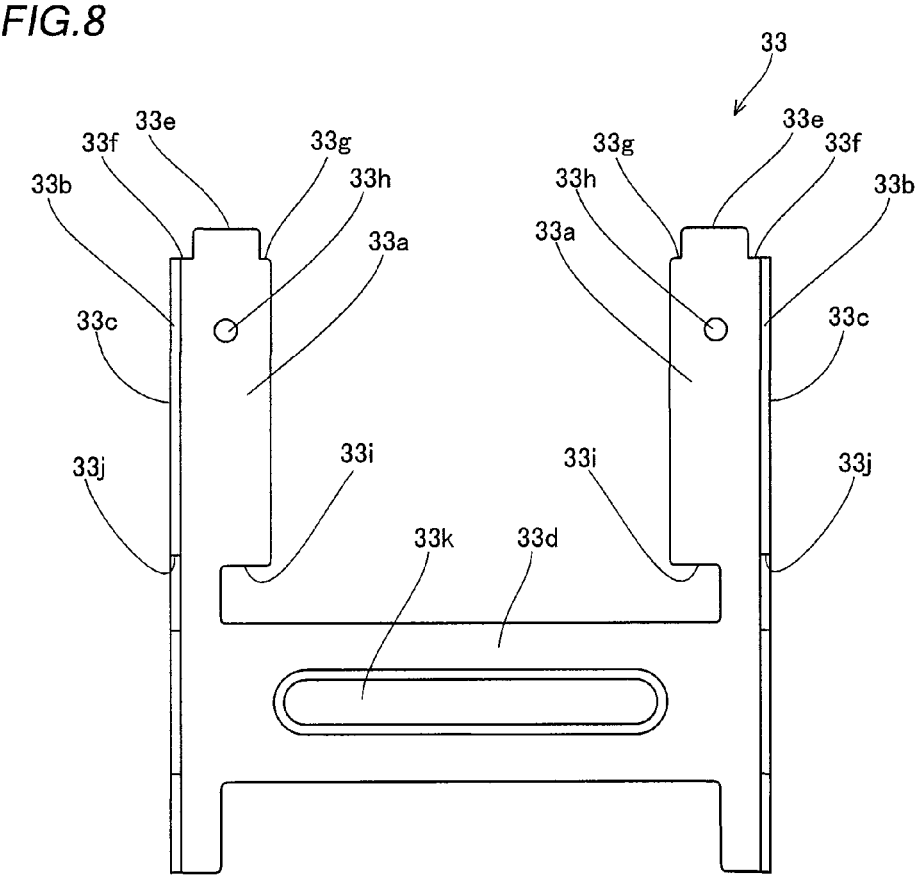
FIG. 8 is a front elevational view of the stand member of the liquid crystal display according to the embodiment shown in FIG. 1.

According to this embodiment, the stand member 33 of sheet metal is formed by partially folding an H-shaped sheet metal member, as shown in FIG. 4. In other words, the pair of support portions 33c having an L-shaped cross section are so formed that planar portions 33a so formed as to come into surface contact with the planar portion 15a (see FIG. 3) of the bracket member 15 (see FIG. 3) and side surface portions 33b formed by folding ends of the planar portions 33a substantially by 90° to extend in the vertical direction are connected with each other. A coupling portion 33d is so integrally provided as to horizontally connect the pair of support potions 33c with each other, as shown in FIGS. 4 and 8. Protrusions 33e convexly protruding upward are formed on upper portions of the pair of support portions 33c respectively, as shown in FIGS. 4 and 8. These protrusions 33e are inserted into the holes 15c of the pair of regulating portions 15b of the bracket member 15 respectively when the bracket member 15 is mounted on the stand member 33, as shown in FIG. 2. Further, contact portions 33f and 33g are formed on both sides of the protrusions 33e to come into contact with the regulating portions 15b (see FIG. 3) of the bracket member 15 (see FIG. 3) respectively when the bracket member 15 is mounted on the stand member 33, as shown in FIGS. 4 and 8. The contact portions 33f and 33g are examples of the "first contact portions" and the "second contact portions" in the present invention respectively. As shown in FIG. 4, the contact portions 33f are so formed that L-shaped contact surfaces are contactable with the regulating portions 15b (see FIG. 5) of the bracket member 15 in a state coinciding with the regulating portions 15b in shape.

As shown in FIGS. 4 and 8, screw receiving holes 33h are provided on the pair of support portions 33c of the stand member 33 in positions corresponding to the threaded holes 15g (see FIG. 3) of the bracket member 15 (see FIG. 3). Further, notches 33i and 33j are provided on the pair of support portions 33c of the stand member 33 respectively as shown in FIGS. 4 and 8, so that the stand member 33 does not interfere with holes 34a (see FIG. 2) of the cover member 34 (see FIG. 2) upon anteroposterior rotation. A rounded convex reinforcing portion 33k for reinforcing the stand member 33 is provided on the coupling portion 33d of the stand member 33 by beading to extend in the horizontal direction, as shown in FIGS. 4 and 8. The reinforcing portion 33k is an example of the "second reinforcing portion" in the present invention.

As shown in FIG. 2, each vertical support member 32 of the stand 30 is provided with three threaded holes 32a, so that the pair of vertical support members 32 are mounted on the base 31 by inserting the corresponding screws 60 into six screw receiving holes 31a provided on the base 31 from below the rear surface 31b of the base 31. The stand member 33 is so mounted on the vertical support members 32 as to be rotatable with torque exceeding a prescribed level. As shown in FIG. 2, further, three types of convex reinforcing portions 31c, 31d and 31e having different shapes are provided on prescribed positions of the base 31 by press working, in order to maintain the strength of the base 31. The cover member 34 is mounted on the base 31 with the screws 60, as shown in FIG. 2.

The display body 10 of the liquid crystal display 100 is so formed that the front and rear cabinets 11 and 14 of resin enclose the liquid crystal module 13 including the liquid crystal panel (not shown), as shown in FIG. 2. A plurality of screw receiving holes (not shown) are provided around the metal chassis 12 of the liquid crystal module 13, so that the chassis 12 is mounted on the front cabinet 11 with screws 70. A plurality of mounting portions 11b are formed on (in this embodiment, seven portions of) the inner side surface 11a of the front cabinet 11 for mounting the rear cabinet 14 on the front cabinet 11. A notch 14a is integrally provided on the rear cabinet 14 in order to conceal the bracket member 15 mounted with the stand member 33, as shown in FIG. 1. A plurality of screw receiving holes 14b are formed on (in this embodiment, seven portions of) the outer periphery of the rear cabinet 14, so that the rear cabinet 14 is mounted on the front cabinet 11 with screws 50. A rectangular recess portion 14d is formed on the side surface 14c of the rear cabinet 14 and a plurality of through-holes 14e are formed in this recess portion 14d, as shown in FIG. 2. The plurality of through-holes 14e are so provided as to connect cables from audiovisual terminals (not shown) connected to a control board (not shown) for controlling the liquid crystal module 13 to an external device for the display body 10.

A procedure for mounting the display body 10 of the liquid crystal display 100 according to this embodiment on the stand 30 is now described with reference to FIGS. 1, 2 and 9 to 12.

Figure 9:
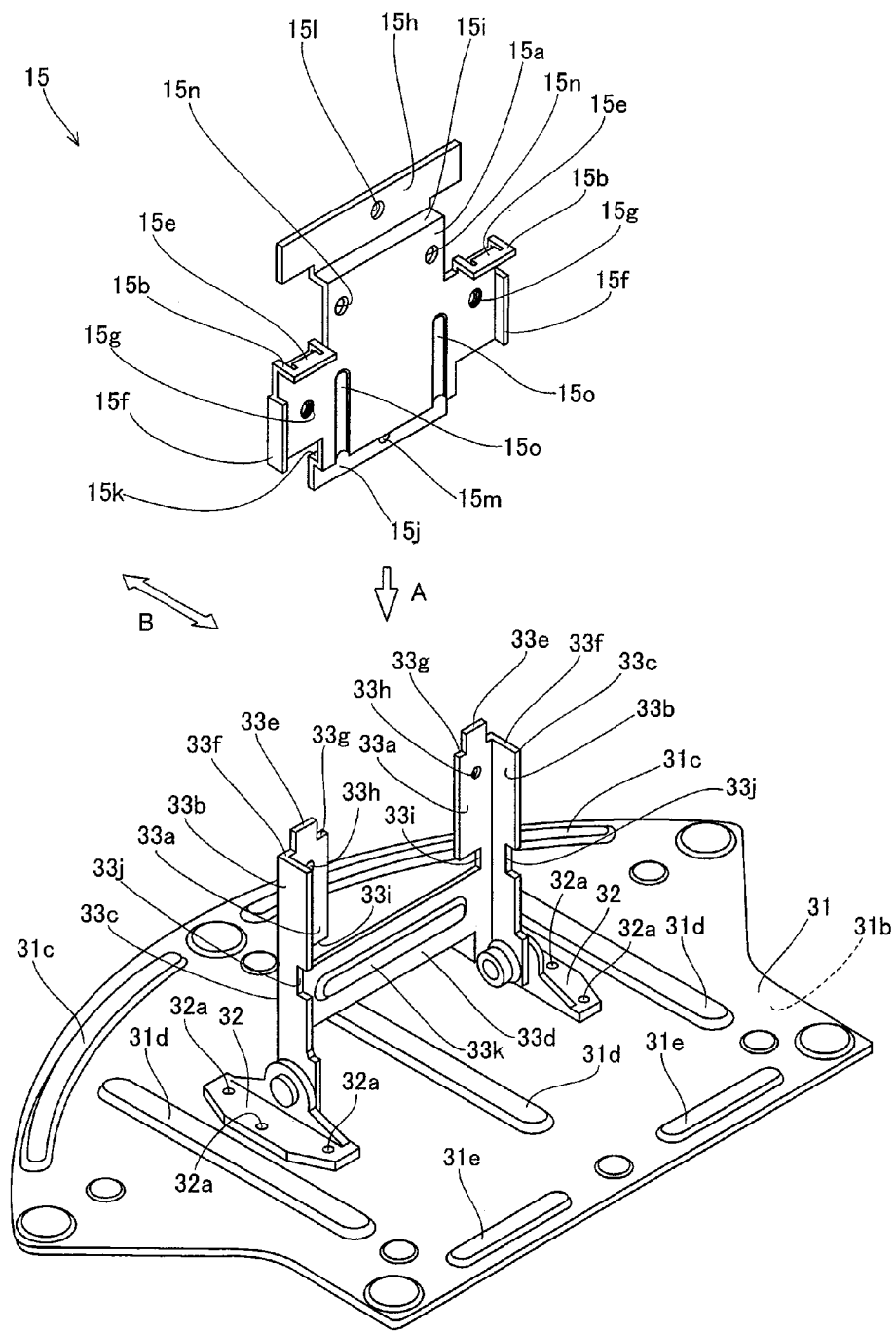
FIGS. 9 to 11 are diagrams for illustrating a procedure for mounting a display body of the liquid crystal display according to the embodiment shown in FIG. 1 on a stand.

First, the assembling operator lowers the display body 10 from above the stand 30, as shown in FIG. 9. At this time, the assembling operator slides the bracket member 15 mounted on the display body 10 parallelly along the planar portions 33a of the stand member 33 along arrow A, as shown in FIG. 10.

Figure 10:
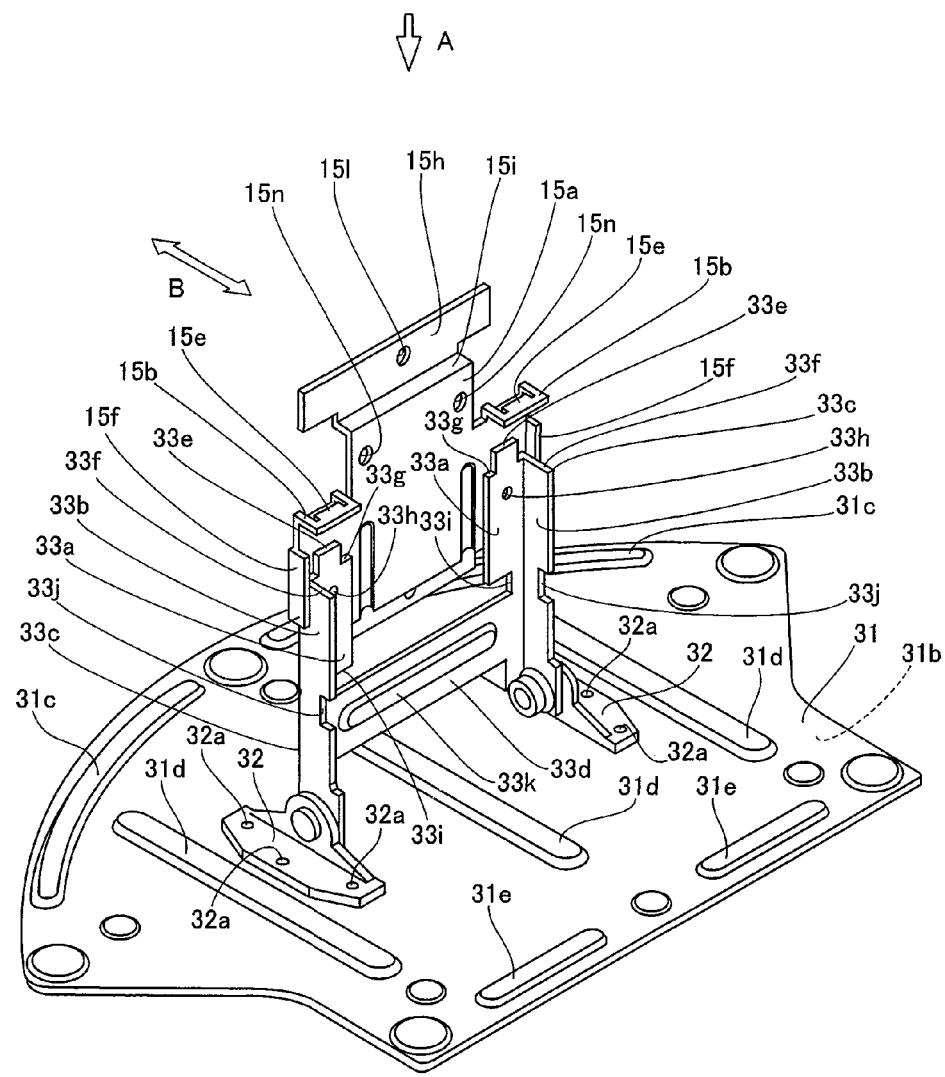
Figure 11:
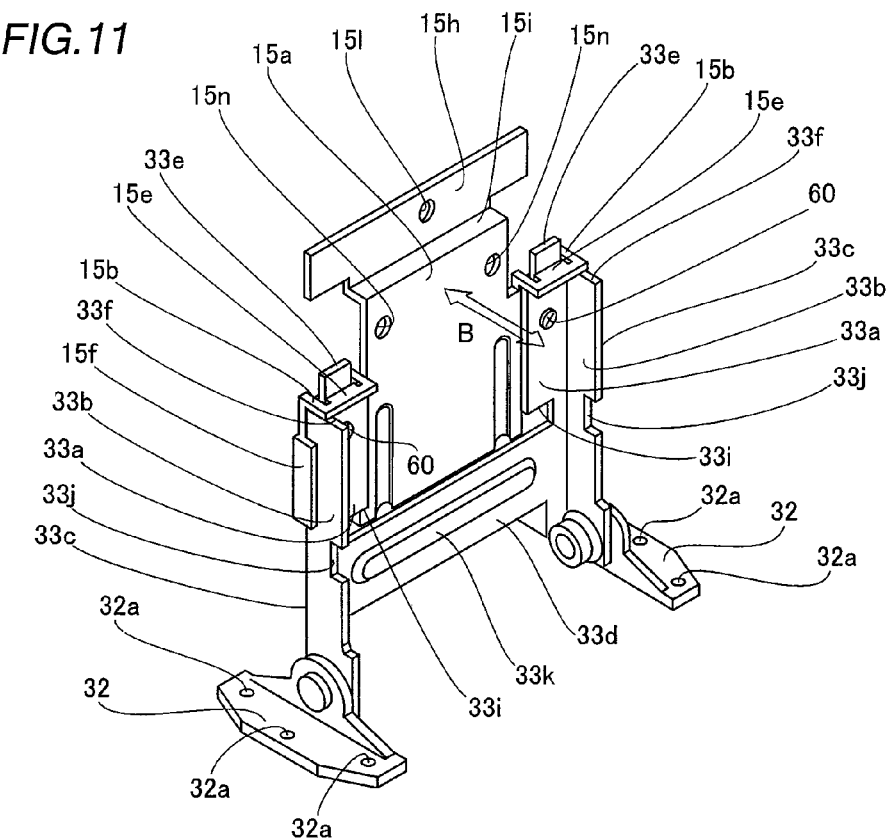

According to this embodiment, the bracket member 15 is downwardly slid while the left and right vertically extending guide portions 15f thereof are guided through the side surface portions 33b of the stand member 33, as shown in FIG. 10. At this time, the bracket member 15 is lowered while the planar portions 33a of the stand member 33 and the planar portion 15a of the bracket member 15 come into contact with each other, as shown in FIG. 10. Then, the left and right protrusions 33e of the stand member 33 are inserted into the holes 15c provided on the bracket member 15 respectively as shown in FIG. 11, so that the pair of regulating portions 15b provided on the bracket member 15 come into contact with the contact portions 33f and 33g provided on both sides of the protrusions 33e of the stand member 33. Thus, the bracket member 15 is inhibited from further downward movement (along arrow A in FIG. 10), and vertically positioned. Referring to FIGS. 9 and 10, the cover member 34 (see FIG. 2) of the stand 30 (see FIG. 1) is omitted, in order to illustrate the procedure for assembling the bracket member 15 and the stand member 33.

Figure 12:
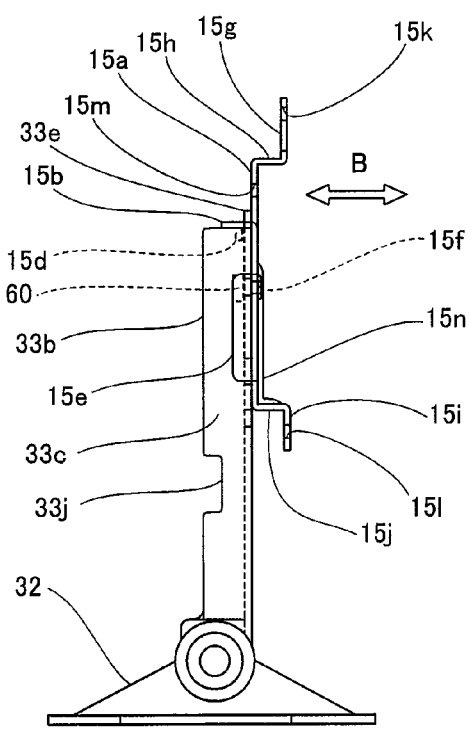
FIG. 12 is a diagram for illustrating the state of the display body of the liquid crystal display according to the embodiment shown in FIG. 1 mounted on the stand.

According to this embodiment, the planar portion 15a and the regulating portions 15e, having the contact surfaces 15c, of the bracket member 15 hold the planar portions 33a of the stand member 33 from the front and the back thereof for suppressing anteroposterior movement of the bracket member 15, thereby anteroposteriorly positioning the bracket member 15 and fixing the same to the stand member 33 in the anteroposterior direction (along arrow B). In other words, the left and right regulating portions 15b fix the upward position of the bracket member 15 with respect to the stand member 33 while the regulating portions 15e hold the bracket member 15 therebetween and fix the same to the stand member 33 in the anteroposterior direction (along arrow B) in this state. In this state, further, the pair of screw receiving holes 33h of the stand member 33 are aligned with the threaded holes 15g of the bracket member 15 respectively. Referring to FIGS. 11 and 12, the base 31 (see FIG. 2) and the cover member 34 (see FIG. 2) of the stand 30 (see FIG. 1) are omitted, in order to illustrate the state of assembling the bracket member 15 and the stand member 33.

As shown in FIG. 11, two screws 60 are inserted into and fastened to the pair of screw receiving holes 33h of the stand member 33 and the pair of threaded holes 15g of the bracket member 15 respectively while the display body 10 is placed (temporarily placed) on the stand member 33, thereby fixing the bracket member 15 to the stand member 33 with the two screws 60. Consequently, the display body 10 is mounted on and fixed to the stand member 33 as shown in FIG. 1, and the liquid crystal display 100 is completely assembled.

According to this embodiment, as hereinabove described, the stand member 33 is so formed as to include the support portions 33c having an L-shaped cross section that the support portions 33c are improved in rigidity dissimilarly to a case where the support portions 33c receiving a vertical load from the display body 10 have a linear cross section. Also when the heavy display body 10 including metal components etc. is placed (temporarily placed) on the stand member 33 from above, therefore, the support portions 33c are so inhibited from buckling that component strength thereof can be improved. Further, the stand member 33 includes the pair of support portions 33c while the bracket member 15 includes the pair of regulating portions 15b regulating downward movement of the bracket member 15 with respect to the stand member 33 by coming into contact with the pair of support portions 33c of the stand member 33 respectively so that the pair of regulating portions 15b vertically position-control the bracket member 15 with respect to the stand member 33 when the former is placed (temporarily placed) on the latter, whereby the display body 10 can be stably placed on the support portions 33c of the stand member 33 through the regulating portions 15b provided on two horizontal portions, dissimilarly to a case where only one regulating portion 15b is provided on the center of the bracket member 15. Further, the bracket member 15 includes the other pair of regulating portions 15e regulating anteroposterior movement of the bracket member 15 with respect to the stand member 33 by anteroposteriorly holding the pair of support portions 33c of the stand member 33 respectively so that the pair of regulating portions 15e anteroposteriorly hold the pair of support portions 33c respectively when the display body 10 mounted with the bracket member 15 is placed (temporarily placed) on the support portions 33c of the stand member 33 from above, whereby movement of the display body 10 is regulated not only in the vertical direction with the regulating portions 15b but also in the anteroposterior direction with the regulating portions 15e provided on the two horizontal portions. Thus, the display body 10 can be reliably anteroposteriorly position-controlled and fixed, while the number of fastening members such as the screws 60 having been generally required for fixing the bracket member 15 to the stand member 33 can be reduced by two in response to the two horizontal portions. While the bracket member 15 is generally fixed to the stand member 33 on four portions, therefore, the number of portions for fastening members such as the screws 60 for fixing the bracket member 15 to the stand member 33 can be reduced to two, thereby improving assembling workability.

According to this embodiment, the bracket member 15 is so formed as to further include the planar portion 15a for coming into surface contact with the pair of support portions 33c (planar portions 33a) of the stand member 33 while the pair of support portions 33c of the stand member 33 are held in the region located between the planar portion 15a and the pair of regulating portions 15e of the bracket member 15 thereby regulating anteroposterior movement of the bracket member 15, whereby the stand member 33 can be reliably anteroposteriorly position-controlled while anteroposteriorly holding the pair of support portions 33c of the stand member 33 with the planar portion 15a and the regulating portions 15e, provided on the two horizontal portions, of the bracket member 15.

According to this embodiment, the pair of regulating portions 15b of the bracket member 15 have the contact surfaces 15d regulating anteroposterior movement of the bracket member 15 while coming into surface contact with the pair of support portions 33c of the stand member 33 respectively so that movement of the display body 10 is regulated through surface contact between the contact surfaces 15d of the regulating portions 15e provided on the two horizontal portions and the pair of support portions 33c of the stand member 33, whereby the display body 10 can be more reliably anteroposteriorly position-controlled.

According to this embodiment, the pair of regulating portions 15b of the bracket member 15 have the holes 15c respectively, and the pair of support portions 33c of the stand member 33 have the protrusions 33e upwardly protruding from the upper portion of the stand member 33 and the contact portions 33f and 33g provided on both sides of the protrusions 33e for vertically coming into contact with the pair of regulating portions 15b of the bracket member 15 respectively so that the protrusions 33e of the stand member 33 are inserted into the holes 15c of the bracket member 15 while the pair of regulating portions 15b of the bracket member 15 come into contact with the contact portions 33f and 33g of the stand member 33 respectively when the bracket member 15 is slid and mounted on the stand member 33, whereby the pair of regulating portions 15b of the bracket member 15 can have both of the function of receiving the pair of protrusions 33e of the stand member 33 in the holes 15c thereof and the function of coming into contact with the contact portions 33f and 33g of the stand member 33.

According to this embodiment, the contact portions 33f and 33g provided on the pair of support portions 33c of the stand member 33 include the contact portions 33f provided on first sides of the protrusions 33e so that the L-shaped contact surfaces come into contact with the regulating portions 15b of the bracket member 15 and the contact portions 33g provided on second sides of the protrusions 33e so that the stand member 33 comes into contact with the regulating portions 15b of the bracket member 15 not only through the contact portions 33g of the protrusions 33e but also through the contact portions 33f having the L-shaped contact surfaces, whereby the bracket member 15 can more reliably come into contact with the stand member 33.

According to this embodiment, the bracket member 15 is provided with the guide portions 15f so formed as to extend in the direction to be slid toward the stand member 33 and the guide portions 15f have the function of guiding the bracket member 15 by moving along the side surface portions 33b of the stand member 33 when the bracket member 15 is slid and mounted on the stand member 33 so that the guide portions 15f of the bracket member 15 can be slid along the side surface portions 33b of the stand member 33, whereby the bracket member 15 can be reliably and easily placed on the support portions 33c of the stand member 33 dissimilarly to a case where the bracket member 15 is provided with no guide portions 15f or the guide portions 15f do not extend in the direction to be slid toward the stand member 33. Therefore, assembling workability for the liquid crystal display 100 can be further improved.

According to this embodiment, both of the bracket member 15 and the stand member 33 are made of sheet metal and the pair of regulating portions 15e of the bracket member 15 are formed integrally with the pair of regulating portions 15b by partially uprighting the pair of regulating portions 15b of the bracket member 15 respectively, whereby the bracket member 15 and the stand member 33 of sheet metal for connecting the heavy display body 10 including metal components etc. can be further improved in strength, while the pair of regulating portions 15e can be easily formed similarly to the pair of regulating portions 15b of the bracket member 15 due to the uprighting.

According to this embodiment, the bracket member 15 has the two threaded holes 15f for mounting the bracket member 15 on the pair of support portions 33c of the stand member 33 and the two threaded holes 15f are so formed by burring as to protrude from the planar portion 15a of the bracket member 15 so that larger depths can be ensured for the threaded holes 15g due to the burring, whereby the bracket member 15 can be more reliably fixed to the stand member 33.

According to this embodiment, the bracket member 15 is so formed as to further include the planar portion 15a for coming into surface contact with the pair of support portions 33c (planar portions 33a) of the stand member 33, the mounting surface 15j for mounting the bracket member 15 on the display body 10 and the second side surface 15k connecting the planar portion 15a and the mounting surface 15j with each other while the planar portion 15a and the second side surface 15k have the reinforcing portions 15o so formed as to extend from the planar portion 15a to the second side surface 15k so that the bracket member 15 can be inhibited from deformation by the reinforcing portions 15o so formed as to extend from the planar portion 15a to the second side surface 15k also when the heavy display body 10 including metal components etc. is placed on the stand member 33, whereby the bracket member 15 can be improved in component strength.

According to this embodiment, the stand member 33 is so formed as to further include the coupling portion 33d so provided as to couple the pair of support portions 33c with each other and the coupling portion 33d has the reinforcing portion 33k so that the stand member 33 can be inhibited from deformation by the reinforcing portion 33k provided on the coupling portion 33d also when the heavy display body 10 including metal components etc. is placed on the stand member 33, whereby the stand member 33 can be improved in component strength.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the liquid crystal display 100 employed as an exemplary display, the present invention is not restricted to this but is also applicable to a display, such as an organic EL panel, for example, having a display screen (display panel) other than the liquid crystal panel.

While the display body 10 of the liquid crystal display 100 is mounted on the stand 30 capable of anteroposteriorly inclining the same by the prescribed angle in the aforementioned embodiment, the present invention is not restricted to this but is also applicable to a case of mounting a display body on a stand capable of horizontally turning the same.

While the stand 30 placed on the floor or the like supports the display body 10 from below in the liquid crystal display 100 according to the aforementioned embodiment, the present invention is not restricted to this but is also applicable to a liquid crystal display having a display body suspended from a support member downwardly extending from the ceiling or the wall.

While the pair of regulating portions 15b for regulating downward movement of the bracket member 15 are integrally provided on the bracket 15 in the aforementioned embodiment, the present invention is not restricted to this but the pair of regulating portions 15b may alternatively be formed independently of the bracket member 15, to be mounted on the bracket member 15.

While the pair of regulating portions 15e for regulating anteroposterior movement of the bracket member 15 are formed integrally with the pair of regulating portions 15b by partially uprighting the pair of regulating portions 15b of the bracket member 15 respectively in the aforementioned embodiment, the present invention is not restricted to this but the pair of regulating portions 15e may alternatively be formed independently of the bracket member 15, to be mounted on the bracket member 15.

While the bracket member 15 has the two threaded holes 15f formed by burring for mounting the pair of support portions 33c of the stand member 33 in the aforementioned embodiment, the present invention is not restricted to this but such holes 15f may not be threaded on the inner side surfaces, but threaded nuts may alternatively be mounted on the surfaces of the holes 15f closer to screw openings thereof.

While the reinforcing portions 15o are formed on the bracket member 15 by beading to extend from the planar portion 15a to the second side surface 15k in the aforementioned embodiment, the present invention is not restricted to this but ribs (reinforcing portions) consisting of flat plates or the like may alternatively be formed by welding or the like to extend from the planar portion 15a to the second side surface 15k.

What is claimed is:

1. A display comprising:
a bracket member mounted on a display screen portion; and
a stand member including a pair of support portions, having an L-shaped cross section, mounted with said bracket member slid from above, wherein
said bracket member includes:
a pair of first regulating portions regulating downward movement of said bracket member with respect to said stand member by coming into contact with said pair of support portions of said stand member respectively,
a pair of second regulating portions regulating anteroposterior movement of said bracket member with respect to said stand member by anteroposteriorly holding said pair of support portions of said stand member respectively,
a planar portion for coming into surface contact with said pair of support portions of said stand member, and
wherein said pair of support portions of said stand member are held in a region located between said planar portion and said pair of second regulating portions of said bracket member thereby regulating anteroposterior movement of said bracket member.

2. The display according to claim 1, wherein
said pair of second regulating portions have contact surfaces regulating anteroposterior movement of said bracket member while coming into surface contact with said pair of support portions of said stand member respectively.

3. The display according to claim 1, wherein
said pair of first regulating portions of said bracket member have holes respectively, and
said pair of support portions of said stand member have protrusions upwardly protruding from an upper portion of said stand member and contact portions provided on both sides of said protrusions for vertically coming into contact with said pair of first regulating portions of said bracket member respectively,
so that said protrusions of said stand member are inserted into said holes of said bracket member while said pair of first regulating portions of said bracket member come into contact with said contact portions of said stand member respectively when said bracket member is slid and mounted on said stand member.

4. The display according to claim 3, wherein
said contact portions provided on said pair of support portions of said stand member include first contact portions provided on first sides of said protrusions so that L-shaped contact surfaces come into contact with said first regulating portions of said bracket member and second contact portions provided on second sides of said protrusions.

5. The display according to claim 1, wherein
said bracket member includes a guide portion so formed as to extend in a direction to be slid toward said stand member, and
said guide portion has a function of guiding said bracket member by moving along the side surface of said stand member when said bracket member is slid and mounted on said stand member.

6. The display according to claim 1, wherein
both of said bracket member and said stand member are made of sheet metal, and said pair of second regulating portions of said bracket member are formed integrally with said pair of first regulating portions by partially uprighting said pair of first regulating portions of said bracket member respectively.

7. The display according to claim 1, wherein
said bracket member has two threaded holes for mounting said bracket member on said pair of support portions of said stand member, and
said two threaded holes are so formed by burring as to protrude from the surface of said bracket member.

8. The display according to claim 1, wherein
said bracket member further includes a planar portion for coming into surface contact with said pair of support portions of said stand member, a mounting surface for mounting said bracket member on said display screen portion and a side surface portion connecting said planar portion and said mounting surface with each other, and
said planar portion and said side surface portion have a first reinforcing portion so formed as to extend from said planar portion to said side surface portion.

9. The display according to claim 1, wherein
said stand member further includes a coupling portion so provided as to couple said pair of support portions with each other, and
said coupling portion has a second reinforcing portion.

10. A display comprising:
a bracket member of sheet metal mounted on a display screen portion; and
a stand member of sheet metal including a pair of support portions, having an L-shaped cross section, mounted with said bracket member slid from above, wherein
said bracket member includes:
a pair of first regulating portions regulating downward movement of said bracket member with respect to said stand member by coming into contact with said pair of support portions of said stand member respectively,
a pair of second regulating portions formed integrally with said pair of first regulating portions by partially uprighting said pair of first regulating portions respectively for regulating anteroposterior movement of said bracket member with respect to said stand member by anteroposteriorly holding said pair of support portions of said stand member respectively,
a guide portion, so formed as to extend in a direction to be slid toward said stand member, having a function of guiding said bracket member by moving along the side surface of said stand member, and
two threaded holes so formed by burring as to protrude from the surface of said bracket member for mounting said bracket member on said pair of support portions of said stand member,
said pair of first regulating portions of said bracket member have holes respectively, and
said pair of support portions of said stand member have protrusions upwardly protruding from an upper portion of said stand member and contact portions provided on both sides of said protrusions for vertically coming into contact with said pair of first regulating portions of said bracket member respectively,
so that said protrusions of said stand member are inserted into said holes of said bracket member while said pair of first regulating portions of said bracket member come into contact with said contact portions of said stand member respectively when said bracket member is slid and mounted on said stand member.

11. The display according to claim 10, wherein
said bracket member further includes a planar portion for coming into surface contact with said pair of support portions of said stand member, and
said pair of support portions of said stand member are held in a region located between said planar portion and said pair of second regulating portions of said bracket member thereby regulating anteroposterior movement of said bracket member.

12. The display according to claim 11, wherein
said pair of second regulating portions have contact surfaces regulating anteroposterior movement of said bracket member while coming into surface contact with said pair of support portions of said stand member respectively.

13. The display according to claim 10, wherein
said contact portions provided on said pair of support portions of said stand member include first contact portions provided on first sides of said protrusions so that L-shaped contact surfaces come into contact with said first regulating portions of said bracket member and second contact portions provided on second sides of said protrusions.

14. The display according to claim 10, wherein
said bracket member further includes a planar portion for coming into surface contact with said pair of support portions of said stand member, a mounting surface for mounting said bracket member on said display screen portion and a side surface portion connecting said planar portion and said mounting surface with each other, and
said planar portion and said side surface portion have a first reinforcing portion so formed as to extend from said planar portion to said side surface portion.

15. The display according to claim 10, wherein
said stand member further includes a coupling portion so provided as to couple said pair of support portions with each other, and
said coupling portion has a second reinforcing portion.

\* \* \* \* \*